INVENTOR.
James S. Harris
BY Charles H. Brown
ATTORNEY

Fig. 2.

Aug. 23, 1955 — J. S. HARRIS — 2,716,156
CODE CONVERTER
Filed June 25, 1953 — 4 Sheets-Sheet 4

| VERT. BUS | 5-UNIT CODE | | | | | 7-UNIT CODE | | | | | | |
|---|---|---|---|---|---|---|---|---|---|---|---|---|
| | #1 | #2 | #3 | #4 | #5 | #1' | #2' | #3' | #4' | #5' | #6' | #7' |
| (1) | 5 | (5 | 5) | – | – | M | – | – | – | – | – | – |
| (2) | 5 | – | – | (5 | 5) | | | | | | | |
| (3) | M | 5 | 5 | – | – | | | | | | | |
| (4) | – | M | 5 | (5 | 5) | – | M | – | – | – | – | – |
| (5) | – | – | M | 5 | 5 | | | | | | | |
| (6) | M | 5 | 5 | 5 | – | | | | | | | |
| (7) | – | M | – | 5 | 5 | – | – | M | – | – | – | – |
| (8) | – | 5 | M | (5 | 5) | | | | | | | |
| (9) | M | 5 | 5 | (5 | M) | | | | | | | |
| (10) | – | M | M | (5 | 5) | – | – | – | M | – | – | – |
| (11) | – | (M | M) | 5 | 5 | | | | | | | |
| | – | (5 | 5) | 5 | 5 | | | | | | | |
| (12) | M | (5 | 5) | – | M | | | | | | | |
| (13) | M | 5 | 5 | M | 5 | | | | | | | |
| (14) | 5 | (5 | 5) | M | 5 | – | – | – | – | M | – | – |
| (15) | 5 | 5 | 5 | (M | 5) | | | | | | | |
| (16) | M | (5 | 5) | (5 | M) | | | | | | | |
| (17) | 5 | (5 | 5) | 5 | M | – | – | – | – | – | M | – |
| (18) | 5 | 5 | 5 | (5 | M) | | | | | | | |
| (19) | M | (5 | 5) | (M | M) | | | | | | | |
| | M | (5 | 5) | (5 | 5) | | | | | | | |
| (20) | M | 5 | 5 | – | M | – | – | – | – | – | – | M |
| (21) | 5 | (5 | 5) | M | M | | | | | | | |
| (22) | 5 | 5 | 5 | (M | M) | | | | | | | |

*Fig. 3.*

INVENTOR.
*James S. Harris*
BY *Charles H. Brown*
ATTORNEY

United States Patent Office 2,716,156
Patented Aug. 23, 1955

2,716,156

CODE CONVERTER

James S. Harris, Old Greenwich, Conn., assignor to Radio Corporation of America, a corporation of Delaware Application June 25, 1953, Serial No. 364,074

6 Claims. (Cl. 178—26)

This invention relates to a code converter of the matrix type for converting a coded signal in the form of $p$ mark and space units per character into another coded signal in the form of $n$ mark and space units per character.

While not limited thereto, this invention is particularly useful in the communications art employing printing telegraph apparatus wherein messages are transmitted over land lines using a five-unit printer code for each character ($p=5$) and wherein the same messages are transmitted over the oceans by radio using a seven-unit protected code for each character ($n=7$). The seven-unit protected code is used to guard against errors caused by interference encountered on radio channels, and is of the type described in Moore and Mathes Reissue Patent 23,028. It is necessary to provide means to quickly and automatically translate a message of five-unit character signals into the corresponding seven-unit character signal. This is done by successively translating each received character signal consisting of five units arranged serially in time into a character signal consisting of five simultaneously present units. The simultaneous five-unit character signal is converted in a code converter to a simultaneous seven-unit character which is then translated to a character signal having seven units serially arranged in time for transmission to a distant point. In practice the code conversion has been performed by electromechanical relay circuits which are becoming inadequate as the speeds with which messages are transmitted are increased. It is, therefore, a general object of this invention to provide a fast-acting electronic code converter of the matrix type which is simpler and more reliable than those previously known.

It is another object to provide an improved electronic code converter for converting from a specific code of $p$ simultaneous units to a specific code of $n$ simultaneous units by circuit means including a minimum number of circuit elements.

It is a further object to provide a code converter including means to recognize groups of units of the input coded signal.

In one aspect the invention comprises a code converter for use in the communications field to translate a simultaneous five-unit printing telegraph code signal to a simultaneous seven-unit protected code signal. The five-unit input signal is on five mark terminals and five space terminals grouped in five pairs, each pair having a potential of 25 volts on the mark terminal and zero volts on the space terminal to indicate a mark, or zero volts on the mark terminal and 25 volts on the space terminal to indicate a space. A plurality of grouping circuits are each responsive to a predetermined signal on two of the input terminal pairs and provide outputs representing the presence and absence of the predetermined signal. The input terminals and the outputs of the grouping circuits are connected to the input of a diode matrix having $q$ vertical buses, there being one bus for each condition of signal on various units of the five-unit code which define one unit of the seven-unit code as a mark. Relatively few vertical buses and diodes are needed in the matrix to provide an output in terms of the seven-unit code.

Other objects, aspects and advantages of the invention will be apparent to those skilled in the art from the following description taken together with the appended drawings wherein:

Figs. 1a and 1b taken together disclose a circuit diagram of a converter for converting the five-unit printing telegraph code to the seven-unit protected code.

Fig. 2 is a chart showing the specific five-unit code for each of thirty-two characters and the equivalent seven-unit code presently in use.

Fig. 3 is a tabulation derived from the chart of Fig. 2 which will be used in explaining the operation of the invention.

Figure 1A:
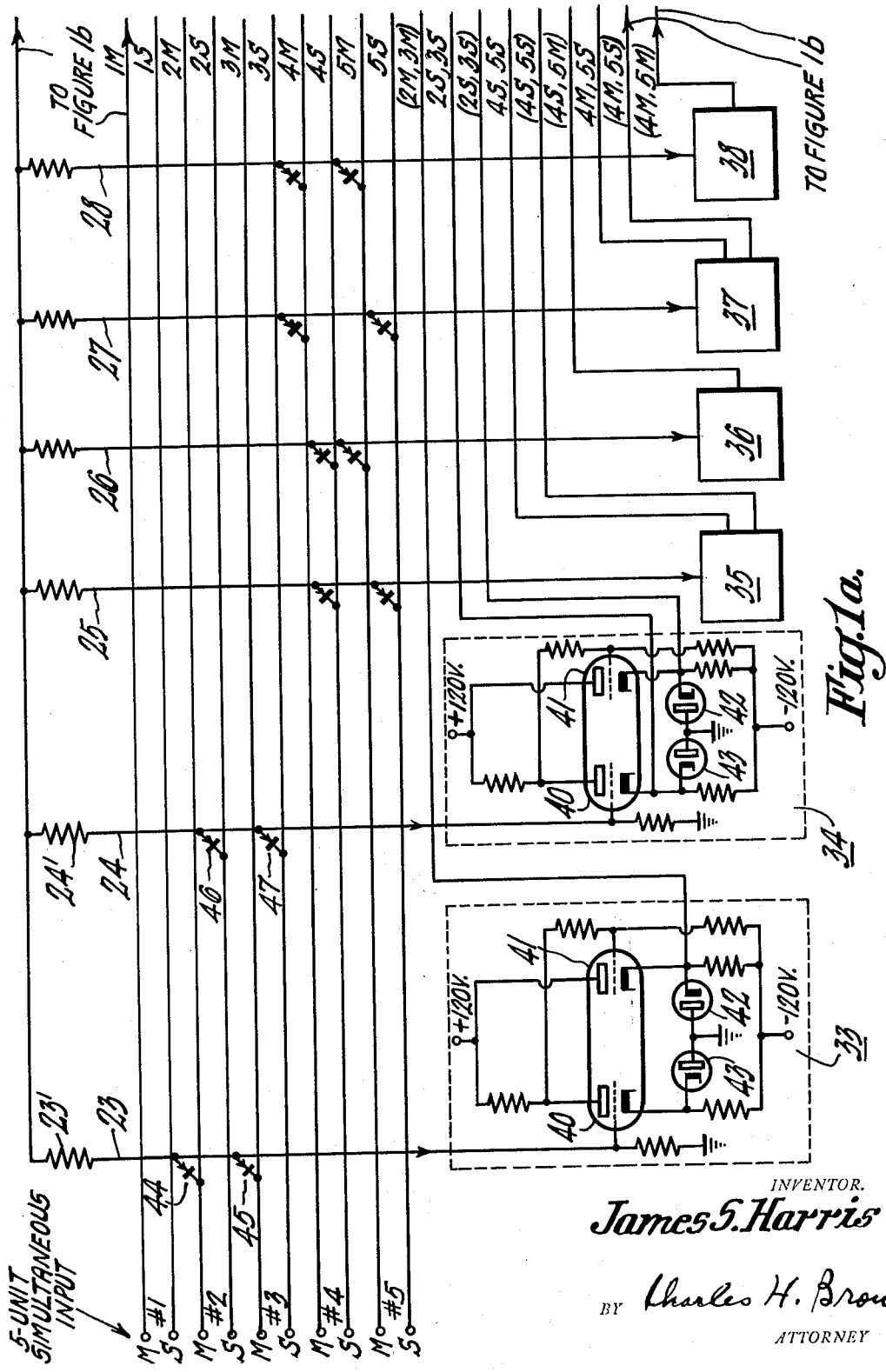

The drawings and descriptions are based on the use of conventional thermionic vacuum tubes and crystal diodes. Heater circuits for the thermionic cathodes have been omitted as such circuits are well known in the art, and their inclusion might obscure the clarity of the presentation of the invention. For the same reason, the details of the direct current power supply have been omitted. The voltages at various supply points in the circuit, and the polarities thereof are indicated on the drawing. It is to be understood that the power supply may include the usual filtering and decoupling arrangements to prevent interaction between the circuits fed from the various points. Values of voltage are illustrative only and are not to be used in a limiting sense. Points of reference potential in the circuits are represented by the symbol for ground. The converter may include thermionic diodes, or crystal diodes such as those including germanium.

Figure 2:
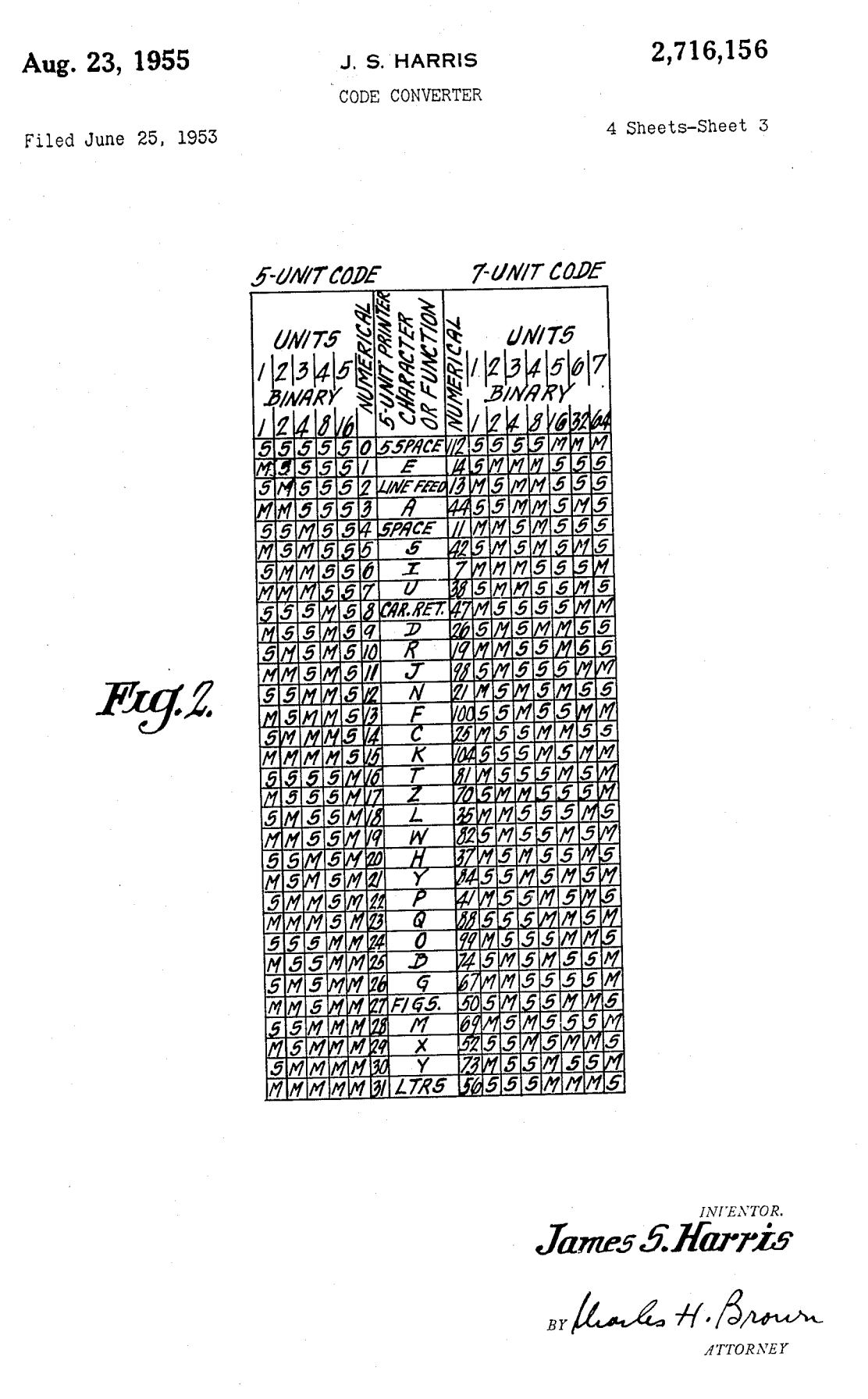

Fig. 1 shows a code converter for converting from a five-unit printer code to a seven-unit code, the equivalent five-unit and seven-unit signals for thirty-two characters being as shown in Fig. 2. The individual units in each of these codes are of the same length. The five-unit signal input is on five pairs of leads labeled #1 through #5. One lead of each pair is a mark lead M and the other lead is a space lead S. A mark is indicated on a pair of leads by a potential of say 25 volts on the mark lead and say zero volts on the space lead. A space is indicated on a pair of leads by a potential of 25 volts on the space lead and zero volts on the mark lead. Circuits for providing a simultaneous input signal of this nature may be the conventional relay circuits or may be circuits as shown in my copending application on a Code Converter System, Serial No. 361,979, filed June 16, 1953, and assigned to a common assignee. By way of example only, the input signal to leads #1 to #5 may be supplied by apparatus as disclosed in an article on page 139 of the February 1949 issue of the Proceedings of the IRE. The output of the code converter is on seven output leads labeled #1′ through #7′. A mark is indicated on an output lead by a potential of say 25 volts and a space is indicated on an output lead by say zero volts.

The code converter includes twenty-two vertical buses labeled (1) through (22) each of which corresponds respectively with the similarly-labeled condition in the tabulation of Fig. 3. There are six additional vertical buses 23 through 28. All the vertical buses are connected through individual resistors to the positive terminal of a source 30 of unidirectional potential. Vertical buses 23 through 28 are connected to condition grouping and reversing circuits 33 through 38.

Each condition grouping and reversing circuit is a reciproconductive circuit like circuit 33 and includes a normally non-conducting vacuum tube or tube structure 40 and a normally conducting vacuum tube or tube structure 41 which may, of course, be in a common evacuated envelope or in separate evacuated envelopes. The values of the circuit elements may be chosen so that the conductive one of tubes 40, 41 has +25 volts on its cathode and the non-conductive one of the tubes has zero volts on its cathode. The grid of tube 41 is normally biased positively by a voltage divider connected to the plate of tube 40. This makes tube 41 conduct and the voltage drop across the cathode resistor maintains the cathode at +25 volts. The voltage is prevented from going below zero by the action of clamping diode 43. When a positive voltage of 25 volts is applied from vertical bus 23 to the grid of tube 40, tube 40 conducts and the drop in voltage on the plate of tube 40 is coupled to the grid of tube 41 to render tube 41 non-conductive. Tube 40 remains conductive and tube 41 remains cut off until the positive voltage from vertical bus 23 to the grid of tube 40 is removed. When +25 volts is applied from bus 23 to the grid of tube 40, rendering it conductive, the potential on the cathode of tube 41 drops to zero volts due to the drop through the cathode resistor: it is prevented from going below zero volts by the action of clamping diode 42. When zero volts is applied from bus 23 to the grid of tube 40, tube 40 is cut off and tube 41 is rendered conductive so that the potential on the cathode of tube 41 returns to +25 volts. Therefore, the output from the cathode of tube 41 provides a potential which is the reverse of that applied to the condition grouping and reversing circuit 33.

Condition grouping and reversing circuit 34 is like circuit 33 and it has an additional output lead from the cathode of tube 40. The potential on the cathode of tube 40 is the same as the potential applied from vertical bus 24 to the grid of tube 40 since the tube acts as a cathode follower. When +25 volts is applied from vertical bus 24 to the grid of tube 40, the tube conducts and the potential on the cathode rises to +25 volts. When zero volts is applied from vertical bus 24 to the grid of tube 40, the tube is cut off and the potential on the cathode falls to zero volts. The potential cannot fall below zero volts because of clamping diode 43. The output potential from the cathode of tube 40 is therefore the same as the potential applied from vertical bus 24 to the grid of tube 40.

It is thus apparent that the outputs from the cathodes of tubes 41 in circuits 33 through 38 provide potentials which are opposite or reversed relative to the input potentials on vertical buses 24 through 28, respectively; and that the outputs from the cathodes of tubes 40 in circuits 34, 35 and 37 provide potentials the same as those on vertical buses 24, 25 and 27, respectively. The circuits serve as low impedance sources for the desired potentials. Circuits 33, 36 and 38 have one output lead and circuits 34, 35 and 37 have two output leads for purposes resulting from an analysis of the five-unit code into twenty-two conditions as will be described in connection with Figs. 2 and 3.

The vertical buses 23—28 assume the lowest potential to which they are connected by means of diodes. Vertical bus 23 is connected by diodes 44 and 45 to the mark leads of input lines #2 and #3, respectively. When a mark is indicated on input lines #2 and #3, there is a potential of +25 volts on the mark leads supplied by the signal source (not shown). The diodes in Fig. 1 are represented by symbols including an arrow pointing in the direction of current flow (as contrasted with electron flow). Current flows from the positive terminal of source 30, through resistor 23', vertical bus 23 and diodes 44 and 45 to the +25 volt potential on the mark leads of lines #2 and #3. There is a 95-volt drop across resistor 23' so that the vertical bus 23 assumes a potential of +25 volts. (If the mark lead of one or both of lines #2 or #3 carries a potential of zero volts, the current flow through resistor 23 results in a drop there across of 120 volts and the potential on vertical bus 23' assumes the value of zero volts.) As described above, when +25 volts is applied from vertical lead 23 to condition grouping and reversing circuit 33, the output lead from the cathode of tube 41 is at a potential at zero volts. This output lead is labeled (2M, 3M) indicating by the parentheses that the output lead carries a signal condition which is the opposite or the reverse of the input signal condition of mark on the #2 lead and mark on the #3 lead. The manner in which this output from circuit 33 is employed in the converter will become apparent as the description proceeds. It will be understood that a zero voltage on circuit output lead (2M, 3M) obtains only when there is a potential supplied by the signal source of +25 volts on both of the input mark leads of lines #2 and #3. If there is a potential of zero volts on one or both of these leads, the drop across resistor 23' is 120 volts and the vertical bus 23 carries a potential of zero volts.

When there is +25 volts on the space leads of both input lines #2 and #3, the current through resistor 24', vertical bus 24 and diodes 46 and 47 causes vertical bus 24 to assume the potential of +25 volts. The output from circuit 34 taken from the cathode of tube 40 is then also +25 volts. This output of circuit 34 is labeled 2S, 3S without parentheses to indicate that the input condition is such that there are space signals on both the #2 and # 3 input lines. The other output from circuit 34 taken from the cathode of tube 41 is labeled (2S, 3S) to indicate that the output represents a condition which is the opposite of the input condition of space on the #2 line and space on the #3 line, i. e., when there is +25 volts on the output, the second and third input units are not both spaces.

Condition grouping and reversing circuit 35 has an input from bus 25 which has a potential of +25 volts when the fourth and fifth units of the input five-unit code are both spaces. The circuit has an output labeled 4S, 5S indicating that the output is +25 volts when the fourth and fifth input units are both spaces. Circuit 35 also has another output labeled (4S, 5S) indicating that this output is +25 volts when the fourth and fifth input units both are not spaces. In like manner, condition grouping and reversing circuits 36, 37 and 38 have input connections and appropriately labeled output leads.

The specific code converter of Fig. 1 described herein as an example of the invention is designed to convert from the presently used five-unit printer code to the presently used seven-unit code. The code equivalents for each of thirty-two characters are as listed in Fig. 2. From an analysis of the codes, it is apparent that if the first unit of the five-unit code is a space and the second and third units of the five-unit code are not both spaces, the first unit of the seven-unit code must be a mark. Referring now to Fig. 1, vertical bus (1) is connected by diode 48 to the space lead of input pair #1, by diode 49 to the (2S, 3S) output from grouping and reversing circuit 34, and by diode 50 to the converter output terminal #1'. The vertical bus (1) assumes a potential of +25 volts when the space terminal of input #1 is at +25 volts indicating a space and the (2S, 3S) output of circuit 34 is at +25 volts. The (2S, 3S) output is at +25 volts when the space terminals of either or both of input lines #2 and #3 are at zero volts indicating that the input on lines #2 and #3 are not both spaces. Vertical bus (1) therefore acts to satisfy the first condition listed in Fig. 3 and a mark is indicated by +25 volts on converter output lead #1. The output lead #1' is connected to a utilization circuit (not shown) which may include a grid resistor 51 of a vacuum tube. The other outputs #2' through #7' are similarly connected to means not shown.

The second condition listed in Fig. 3 is that if the first unit of the five-unit input is a space and the fourth and fifth units are not both spaces, the first unit of the seven-unit code also must be a mark. This condition is taken care of by vertical bus (2) which is connected by diodes to the space terminal of converter input #1, to the (4S, 5S) output of grouping and reversing circuit 35, and to the converter output #1: Then if the five-unit input is space signal on the #1 line and is not a space signal on both the #4 and #5 lines, the vertical bus (2) conveys a potential of +25 volts to the #1′ output terminal indicating a mark thereon.

In like manner the third through twenty-second conditions listed in Fig. 3 are taken care of by vertical buses (3) through (22). It will be noted that eleventh condition listed in Fig. 3 is that if the second and third units of the five-unit code are different, i. e., one is mark and the other is space, or, stated another way, they are not both marks or not both spaces, and if the fourth and fifth units are spaces, then the fourth unit of the seven-unit code must be a mark. This condition is taken care of in the converter by vertical bus (11) connected through individual diodes to the (2M, 3M) output of circuit 33, to the (2S, 3S) output of circuit 34, to the 4S, 5S output of circuit 35 and to the converter output terminal #4′. Vertical bus (19) also takes care of a similar situation wherein either one of the fourth and fifth units of the five-unit code should be a mark and the other should be a space to satisfy the condition.

Figure 1B:
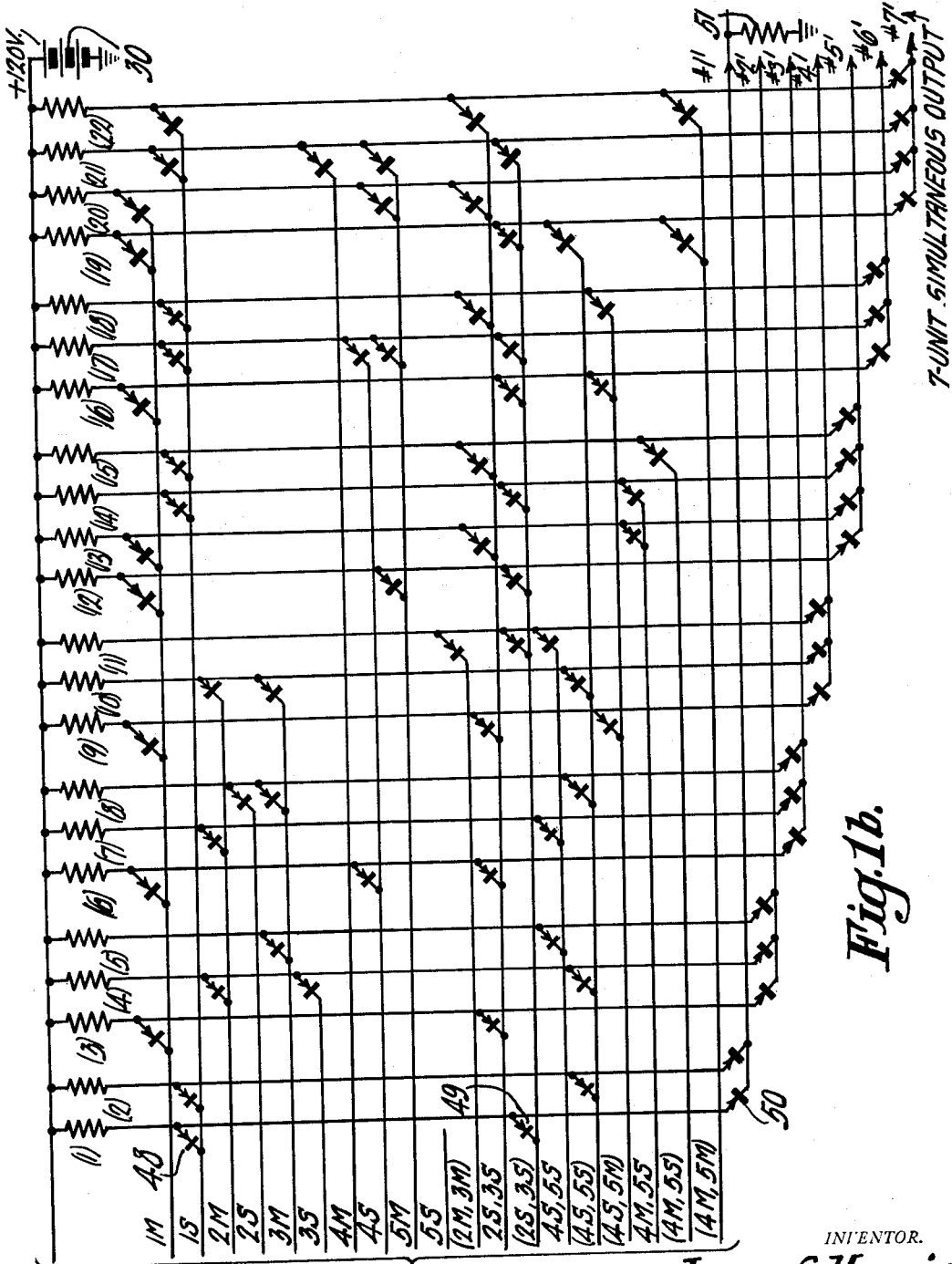

A further reduction in the number of diodes required in the matrix of Fig. 1b may be achieved by utilizing the 2M, 3M output from the cathode of tube structure 40 of grouping and reversing circuit 33, the 4S, 5M output from circuit 36 and the 4M, 5M output from circuit 38. The vertical bus (10) would then be coupled by a single diode to the 2M, 3M output rather than by one diode to the 2M terminal and by another diode to the 3M terminal. Similarly the vertical bus 17 would be connected the 4S, 5M output, and the vertical bus 21 would be connected to the 4M, 5M output. Three diodes would be saved by thus extending the grouping principle of this invention.

The code converter of Fig. 1 is illustrative of the invention as applied to specific five-unit and seven-unit codes presently in use. The invention may, of course, be applied to other codes, especially those wherein the rules for conversion from one code to the other code involves the grouping of units. The codes shown in Fig. 2 involve a grouping as follows: The first unit of the five-unit code is related to the first unit of the seven-unit code: The second and third units of the five-unit code are related to the second, third and fourth units of the seven-unit code: and the fourth and fifth units of the five-unit code are related to the fifth, sixth and seventh units of the seven-unit code. While these relationships generally exist between the two codes, there are quite a number of exceptions which must be taken care of to accomplish the desired conversions. A converter constructed according to the teachings of this invention includes fewer circuit components than are required in converters previously known in the art.

What is claimed is:

1. A converter for converting from a $p$-unit code to an $n$-unit code, the codes being such that there are $q$ conditions of the $p$-unit code each of which defines a unit of the $n$-unit code, comprising, input terminals for a simultaneous code of $p$ units, a plurality of grouping circuits each having an input coupled to at least two of said input terminals, a bus for each of said $q$ conditions, $n$ output terminals and means connecting said buses to said output terminals, and means connecting said buses to said input terminals and to the outputs of said grouping circuits which define the corresponding condition.

2. A converter for converting from a $p$-unit code to an $n$-unit code, the codes being such that there are several conditions of the $p$-unit code which define a unit of the $n$-unit code, comprising, input terminals for a simultaneous code of $p$ units, a plurality of grouping and reversing circuits each having an input coupled to two of said input terminals, a bus for each of said several conditions, $n$ output terminals and diodes connecting said buses to said output terminals, and diodes connecting each of said buses to said input terminals and to the outputs of said grouping and reversing circuit outputs which define the corresponding condition.

3. A converter for converting from a $p$-unit code to an $n$-unit code, the codes being such that there are $q$ conditions of the $p$-unit code which define one of the units of the $n$-unit code, comprising, a source of a simultaneous signal of $p$ units, said source having $p$ mark terminals and $p$ space terminals grouped in $p$ pairs: each pair having a predetermined potential on the mark terminal to indicate a mark or said predetermined potential on the space terminal to indicate a space, a plurality of grouping circuits each having an input coupled to at least two of said source terminals and having at least one output terminal, a bus for each of said $q$ conditions, $n$ output terminals, $q$ diodes connecting said buses to said $n$ output terminals, and diodes connecting each of said buses to said source terminals and said grouping and reversing circuit outputs which define the corresponding condition.

4. A converter for converting from a $p$-unit code to an $n$-unit code, the codes being such that there are $q$ conditions of the $p$-unit code which define one of the units of the $n$-unit code, comprising, a source of a simultaneous signal of $p$ units, said source having $p$ mark terminals and $p$ space terminals grouped in $p$ pairs, each pair having a predetermined potential on the mark terminal to indicate a mark or said predetermined potential on the space terminal to indicate a space, a plurality of grouping and reversing circuits each having an input coupled to two of said source terminals and having a first output indicative of the presence of, and a second output indicative of the absence of, said predetermined potential on the input terminals, a bus for each of the $q$ conditions, $n$ output terminals, $q$ diodes connecting said buses to said $n$ output terminals, and diodes connecting each of said buses to said source terminals and said grouping and reversing circuit outputs which define the corresponding condition.

5. A converter for converting from a $p$-unit code to an $n$-unit code, the codes being such that there are $q$ conditions of less than all of the possible $p$-unit conditions wherein any one condition within one of $n$ groups of conditions defines at least one unit of the $n$-unit code, comprising, a source of a simultaneous signal of $p$ units, said source having $p$ mark terminals and $p$ space terminals grouped in $p$ pairs, each pair having a given potential on the mark terminal to indicate a mark or said given potential on the space terminal to indicate a space, a plurality of grouping and reversing circuits each having an input circuit coupled to two of said source terminals and having a first output indicative of the presence of said given potential on both of the corresponding source terminals and a second output indicative of the lack of said given potential on both of the corresponding source terminals, a bus for each of the $q$ conditions, $n$ output terminals, one for each unit of the $n$-unit code and each of said $n$ groups of conditions, a diode connecting each of said buses to the corresponding one of said output terminals, and diodes connecting each of said buses to said source terminals and said grouping and reversing circuit outputs which define the corresponding condition.

6. A converter as defined in claim 5 wherein each of said grouping and reversing circuits comprises a pair of vacuum tubes connected in a reciproconductive circuit, and having an input circuit coupled to the normally nonconducting one of said tubes.

References Cited in the file of this patent

UNITED STATES PATENTS

| 2,476,066 | Rochester | July 12, 1949 |
| 2,520,142 | Herbst | Aug. 29, 1950 |
| 2,620,395 | Snijders | Dec. 2, 1952 |
| 2,622,148 | Van Buuren | Dec. 16, 1952 |